United States Patent [19]
Kühn et al.

[11] Patent Number: 5,754,252
[45] Date of Patent: May 19, 1998

[54] MULTI-STANDARD TELEVISION RECEIVER

[75] Inventors: Hans-Jürgen Kühn, Buchholz; Ulf Buhse, Kollmar, both of Germany

[73] Assignee: U.S. Philips Corporation, New York, N.Y.

[21] Appl. No.: 599,842

[22] Filed: Feb. 12, 1996

[30] Foreign Application Priority Data

Feb. 11, 1995 [DE] Germany ............ 195 04 566.1

[51] Int. Cl.$^6$ ............ H04N 3/27; H04N 5/60; H04N 5/62
[52] U.S. Cl. ............ 348/554; 348/736
[58] Field of Search ............ 348/736, 737, 348/738, 554, 560; H04N 5/60, 3/27, 5/62

[56] References Cited

U.S. PATENT DOCUMENTS

| | | | |
|---|---|---|---|
| 4,405,834 | 9/1983 | Buhse et al. | 348/445 |
| 4,470,071 | 9/1984 | Rindal | 348/737 |
| 4,811,096 | 3/1989 | Gakumura | 348/736 |
| 4,821,097 | 4/1989 | Robbins | 348/485 |
| 4,933,767 | 6/1990 | Hyanutake | 348/736 |
| 5,570,137 | 10/1996 | Goeckler | 348/726 |

OTHER PUBLICATIONS

Television Engineering Handbook, K.B. Benson, Table 21–5, pp. 21.10–21.11, 1986.
"Adjustment Free Multistandard Sound–IF Integrated Circuit With Automatic Sound Carrier Indentification", by M. Rieger et al, IEEE, 1993, pp. 104–105.

*Primary Examiner*—John K. Peng
*Assistant Examiner*—Vivek Srivastava
*Attorney, Agent, or Firm*—Edward W. Goodman

[57] ABSTRACT

In a multi-standard television receiver in which a picture signal contained in a television signal and modulated on a picture carrier is converted to a picture signal intermediate frequency, and a stereo sound signal or two-tone signal contained in the television signal and modulated on two sound carriers is converted to two first sound signal intermediate frequencies, it is ensured for possibly simple filtering of the sound signals, also at different frequency spacings between the picture carrier and the sound carriers, that two sound signal filters (8, 9) having a fixed, predetermined filter central frequency are provided for filtering the stereo sound signal, and that frequency shift circuitry (6) is provided which, in dependence upon the frequency spacing between the picture carrier of the television signal and its sound carriers, shifts the picture carrier contained in the picture signal converted to the IF position to such a frequency that the sound IF signals of the first sound intermediate frequencies mixed with this shifted picture carrier occur at two second sound signal intermediate frequencies which are filtered by the sound IF filters (8, 9).

7 Claims, 3 Drawing Sheets

MULTI-STANDARD TELEVISION RECEIVER

BACKGROUND OF THE INVENTION

1. Field of the Invention

The invention relates to a multi-standard television receiver in which a picture signal, contained in a television signal and modulated on a picture carrier, is converted to a picture signal intermediate frequency, and a stereo sound signal, or two-tone signal, contained in the television signal and modulated on two sound carriers, is converted to two first sound signal intermediate frequencies.

A picture signal converted to the IF position in a television receiver generally contains picture information components which are modulated on a picture carrier, as well as sound information components which are modulated on one or two sound carriers. Dependent on the transmission standard of the television signal, the frequency spacing between the picture carrier, on the one hand and the sound carrier(s), on the other hand, is chosen to be different. Known television receivers therefore comprise, after forming a second sound-IF, a plurality of filters at different central frequencies which filter the sound signals. For a multi-standard television receiver which, for example, is suitable for processing television signals of all known television standards, seven sound signal filters of this type are required. Dependent on the transmitted television standard and the frequency spacing between the sound carriers, one or more of these several filters are used.

2. Description of the Related Art

Moreover, it is known from the publication IEEE, 1993, pp. 104 and 105 from the report "Adjustment Free Multi-standard Sound-IF Integrated Circuit with automatic Sound Carrier Identification," to perform a first and a second mixing of the signal, which leads to third, fixed intermediate frequencies of 500 kHz and 260 kHz. It is then necessary to suppress mirror frequencies, which is very cumbersome. Moreover, the set-up is only advantageous if also the second sound-IF is included in the integration of the circuit and the IF filters can then be integrated for 500 kHz and 260 kHz.

SUMMARY OF THE INVENTION

It is an object of the invention to provide a multi-standard television receiver of the type described in the opening paragraph, which, with a possibly simple structure, suffices with fewer filters for filtering a stereo sound signal contained in the television signal.

According to the invention, this object is solved in that two sound signal filters having a fixed, predetermined filter, central frequency are provided for filtering the stereo sound signal, and in that frequency shift means are provided which, in dependence upon the frequency spacing between the picture carrier of the television signal and its sound carriers, shift the picture carrier, contained in the picture signal converted to the IF position, to such a frequency that the sound IF signals of the first sound intermediate frequencies mixed with this shifted picture carrier occur at two second sound signal intermediate frequencies which are filtered by means of the sound IF filters.

According to the invention, two sound signal filters with a fixed central frequency are provided for filtering a two-tone signal or a stereo tone signal which is contained in a television signal converted to an intermediate frequency. These filters are used for filtering the stereo sound signal after conversion to second intermediate frequencies by means of mixing with, for example, the picture carrier, after conversion to the first intermediate frequencies. At different frequency spacings between the carrier of the picture signal and the carrier frequencies of the sound signals, different central frequencies of the converted sound signals would then, however, result. Consequently, according to the invention, frequency shift means are provided which initially serves the purpose of shifting the previously filtered picture carrier as regards its frequency position. This shift is chosen to be such that the sound signals converted to the first IF position have the second IF positions and thus have exactly the central frequencies of the two sound signal filters after mixing with the picture carrier which has been converted as regards its frequency position. These filters can then always operate at a fixed frequency which is particularly independent of the frequency spacing between the picture carrier and the sound carriers. Thus, the frequency spacing between the picture carrier and the sound carriers in the first intermediate frequencies is quasi-corrected to such an extent that the frequency-shift means supplies a picture carrier shifted at the output end in such a way that it always has a given frequency which is independent of the transmission standard of the received television signal. The sound signals in the first IF position are then also always converted to fixed frequencies, namely, the second sound intermediate frequencies, by mixing with this converted picture carrier, which sound intermediate frequencies are filtered by means of the sound signal filter.

It is particularly achieved thereby that only two filters having a fixed frequency are required for a stereo sound signal. As compared with arrangements having, for example, five or seven filters of this type, this implies a considerable reduction of the number of components, particularly because these filters are constructed as ceramic filters and can hardly be realized in integrated circuits. The circuit also has a low number of components because the circuit arrangement for detecting the transmission standard of the television signal is generally provided in multi-standard television receivers, whose information can be directly used for determining the frequency spacing between the picture carrier and the sound carriers of the received television signal, because this frequency spacing is fixed and known in advance for each transmission standard.

In accordance with an embodiment of the invention, the central frequencies of the sound signal filters are 5.5 and 5.742 MHz. These frequency spacings are provided for television signals of the B/G standard. When a television signal of these transmission standards is received, no frequency shift of the picture carrier before mixing with the sound carriers converted to the first IF frequency position is required. When television signals of other transmission standards are received, a conversion is necessary, while the frequency shift of the picture carrier is to be realized in such a way that the sound signals mixed with the picture carrier and converted to the second IF position occur at said central frequencies of the filters.

For the layout of the above-mentioned means it may be advantageous, in accordance with a further embodiment of the invention, that the first sound signal intermediate frequencies are 32.4 and 32.158 MHz and the frequency at which the picture carrier contained in the picture signal converted to the IF position is shifted, is 37.9 MHz.

In accordance with a further embodiment of the invention, the above-mentioned means for frequency-shifting the picture carrier by mixing with the sound carriers converted to the first IF position is provided with a conversion control means which, in dependence upon the transmission standard of the television signal and the frequency spacing between picture carrier and the sound carriers prescribed in accordance with this standard, supplies conversion signals to a conversion device which in dependence upon the conversion signal, converts the frequency of the picture carrier contained in the picture signal converted to the IF position.

In accordance with a further embodiment of the invention, the frequency shift means is provided with a phase-locked loop circuit which locks in on the picture carrier which is shifted as regards its frequency. The PLL is used for the purpose of suppressing the mixing signals occurring in addition to the shifted picture carrier. It locks in only on the frequency of the shifted picture carrier.

In accordance with a further embodiment of the invention, the means is provided with a quadrature mixer in which the picture carrier, converted to the IF position, and a first difference signal, having a frequency corresponding to the difference of the frequencies between the picture carrier converted to the IF position and the shifted picture carrier, are mixed by means of a first multiplier, in that the picture carrier converted to the IF position and shifted 90° in phase, and a second difference signal, which is identical to the first difference signal but is 90° shifted in phase with respect thereto, are mixed in the quadrature mixer by means of a second multiplier, and in that an adder is provided which adds the output signals of the two mixers.

By means of this quadrature mixer, a frequency-converted picture carrier is gained in such a way that the mixing products occurring in addition to the picture carrier are already suppressed to a relatively satisfactory extent. If this signal is additionally applied to the PLL, it can lock in on the picture carrier unambiguously and supply the picture carrier in a form which is free from further mixed products at the output.

These and other aspects of the invention will be apparent from and elucidated with reference to the embodiments described hereinafter.

DESCRIPTION OF THE PREFERRED EMBODIMENT

Figure 1:
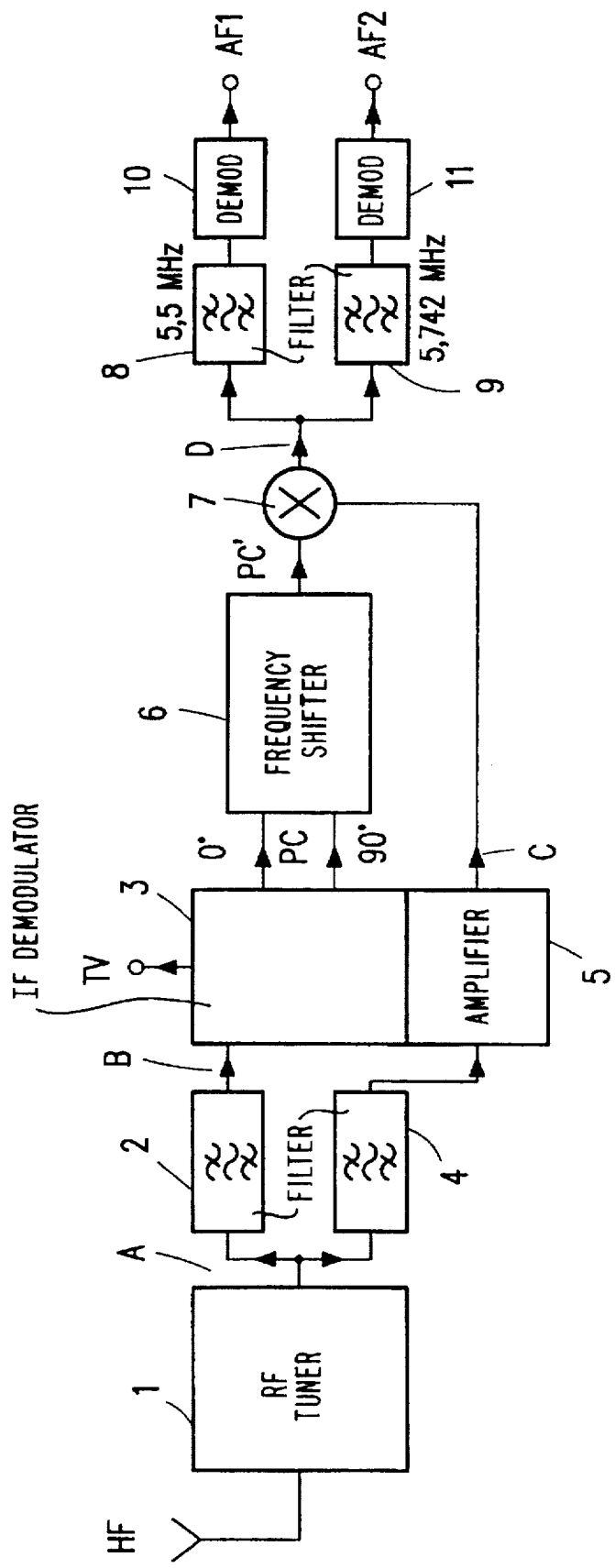
FIG. 1 is a block diagram of a multi-standard television receiver according to the invention.

A multi-standard television receiver shown in the form of a block diagram in FIG. 1 is used for processing television signals of different transmission standards. Dependent on the transmission standard, the frequency spacings of the picture carrier on which the picture signal is modulated and the sound carriers on which a stereo tone signal or a two-tone signal is modulated may differ. The circuit shown in FIG. 1 circumvents the problems arising for filtering the sound signals in that the picture carrier converted to the IF position is shifted as regards its frequency.

The circuit of FIG. 1 shows, at the input end an RF tuner 1 which receives an RF signal which comprises a television signal to be processed. In a manner not shown, the tuner 1 provides a conversion of this television signal to an IF position. The tuner 1 supplies, at the output end, the picture signal converted to the IF position, which signal contains picture information components which are modulated on a picture carrier, as well as sound information components which are modulated on two sound carriers in a first IF position.

This output signal of the tuner 1, which is denoted by A in FIG. 1, is applied to two filters. On the one hand, a filter 2 is provided which filters the picture signal modulated on the picture carrier and which filters this picture carrier. The filter 2 thereby supplies, at the output end, a signal denoted by B in the Figure, which signal is the picture signal converted to the IF position. This signal is subsequently demodulated in an IF demodulator 3 which supplies a picture signal as an output signal denoted by TV in FIG. 1.

The output signal A of the tuner 1 is also applied to a filter 4 which filters the sound signals on which two sound carriers having the first IF position are modulated. These signals are subsequently amplified in a controlled amplifier 5. This amplifier 5 supplies, at the output end, a signal denoted by C in FIG. 1, which signal is the two sound carriers as well as the sound signals modulated on these carriers, with the sound carriers being converted to the first IF position.

The IF demodulator 3, indicated only as a circuit block in FIG. 1 and used for demodulating the picture signal, must use the picture carrier for demodulating the television signal. This picture carrier, which is required for demodulating the picture signal anyway, can thus be used for mixing with the signal C. In prior-art circuits, this is effected directly. However, the sound signals occur in different frequency ranges at the mixer output end, dependent on the transmission standard of the television signal.

This problem is eliminated by the circuit according to the invention shown in FIG. 1, in that the picture carrier PC which is present in its original phase position as well as in a phase position shifted by 90°, is applied to frequency-shift means 6. This means 6 shifts the frequency of the picture carrier PC. As stated, the picture carrier PC is the picture carrier shifted to the intermediate frequency of the received television signal. This picture carrier is shifted as regards its frequency by the means 6 in such a way that after mixing of this shifted picture carrier with the signal C, the sound signals, which are modulated on two sound carriers in the first IF position, occur in the desired frequency ranges of a second IF position.

In FIG. 1, the picture carrier which is shifted as regards its frequency is denoted by PC' as an output signal of the means 6. This signal is applied to a mixer 7 to which the signal C is also applied. By mixing this frequency-shifted picture carrier with the two sound carriers converted to the first IF positions, their central frequencies are converted to new frequency ranges, namely, to the second sound IF positions. This signal, which is thus converted, is denoted by D in FIG. 1. This signal reaches two sound signal filters 8 and 9, of which the filter 8 in the embodiment of FIG. 1 has a central frequency of 5.5 MHz and the filter 9 has a central frequency of 5.742 MHz. The output signals of the two filters 8 and 9 are applied to demodulators 10 and 11 which demodulate, i.e., convert in the baseband position, the sound signals modulated on sound carriers of the second IF position and filtered by means of the filters 8 and 9. The demodulators 10 and 11 thus supply the stereo sound signals AF1 and AF2 at the output.

The operation of the circuit arrangement of FIG. 1 and particularly the operation of the frequency shift means 6 will be elucidated with reference to FIG. 2 which represents some signals occurring in the circuit arrangement of FIG. 1.

FIGS. 2A-2E shows diagrammatically five signals relating to their frequency spectrum.

Figure 2A:
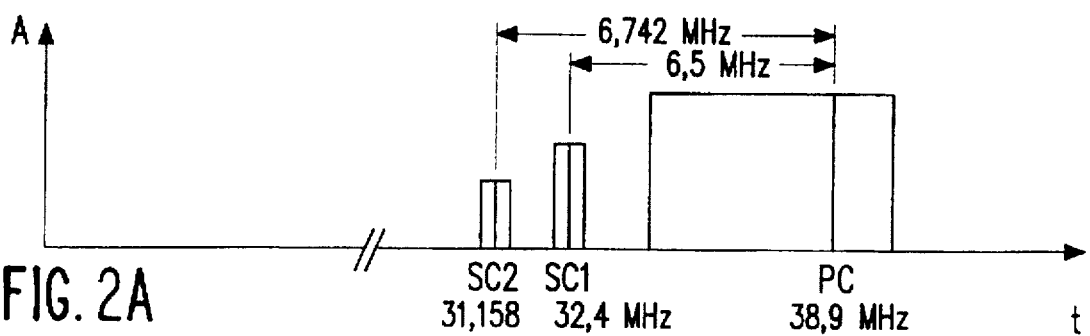
FIGS. 2A–2E shows some signals occurring in the television receiver of FIG. 1.

FIG. 2A, upper part, shows the signal A as supplied by the tuner 1 of the circuit arrangement of FIG. 1 at the output. As already explained hereinbefore, this tuner already converts the received television signal into an IF position. In the example shown for the signal A in FIG. 2, it is assumed that the picture carrier of the received television signal, which is denoted by PC, has been converted to a frequency of 38.9 MHz. The two sound carriers which are converted to first IF positions have frequencies of 32.4 and 32.158 MHz. At the received television signal, which is, for example, a signal of the DK standard, the frequency spacings between the sound carriers and the picture carrier are 6.5 and 6.742 MHz, respectively. These frequency differences between the picture carrier, on the one hand and the sound carriers, on the other hand, differ, dependent on the transmission standard of the television signal.

Figure 2B:
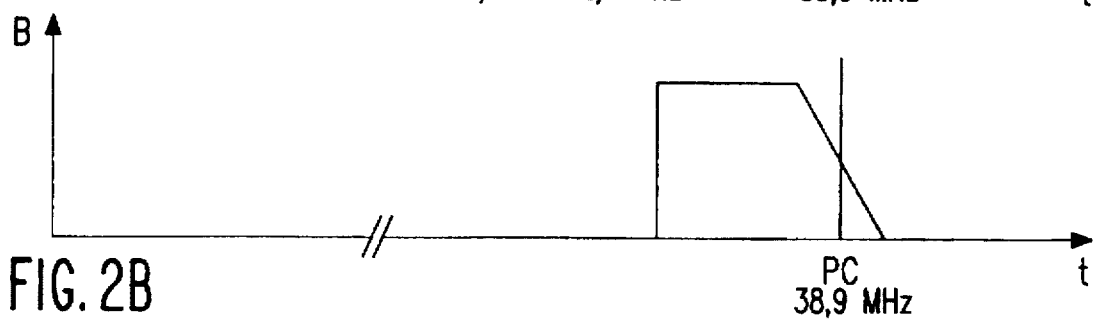

The variation of the curve B in FIG. 2B shows the output signal of the picture signal filter 2 of the circuit arrangement shown in FIG. 1. Here, the picture signal with the known Nyquist edge has been filtered. As hereinbefore, the picture carrier PC is at 38.9 MHz.

Figure 2C:
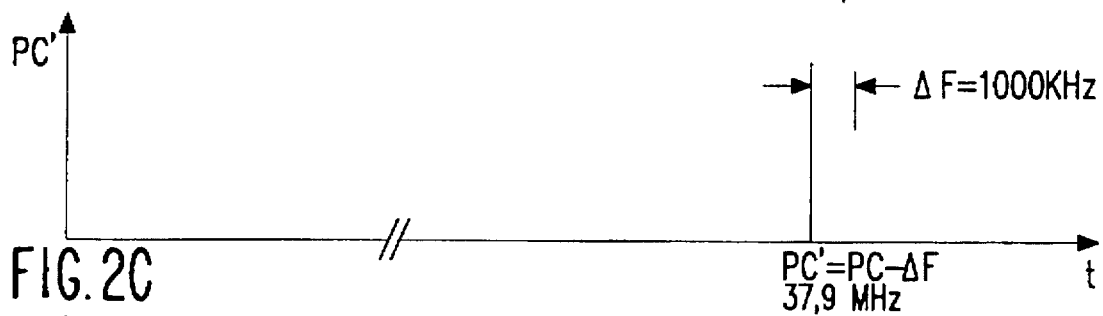
Figure 2D:
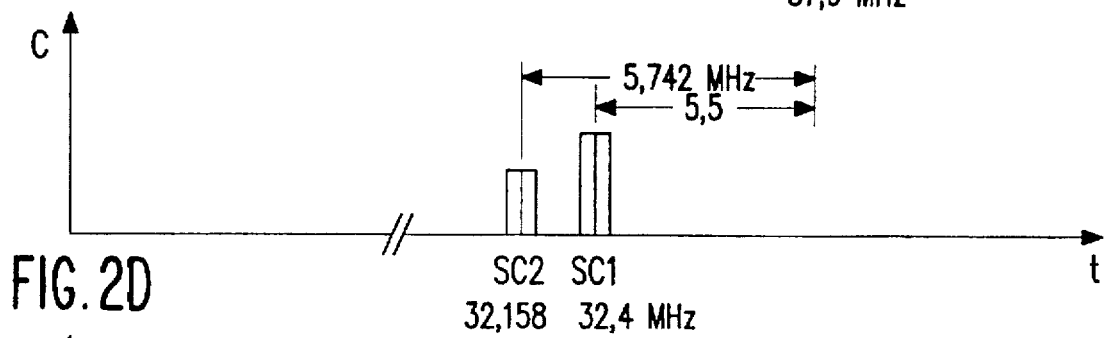

As a third curve, the signal PC' is shown in FIG. 2C which represents the output signal of the means 6 for frequency shifting the picture carrier converted to the IF position. This signal is mixed in the mixer 7 of FIG. 1 with the sound carriers converted to the first IF position so that these sound carriers occur at the output at the second sound intermediate frequencies. In the example of FIG. 1, the sound carriers should have frequencies of 5.5 and 5.742 MHz in accordance with the central frequencies of the filters 8 and 9. In the example shown in FIGS. 2A-2E a direct mixing would, however, result in the difference frequencies of 6.5 and 6.742 MHz which cannot be filtered by means of the filters 8 and 9. According to the invention, a shift of the picture carrier converted to the IF position of 38.9 MHz by means of the means 6 to such a frequency should be carried out that after mixing with the sound carriers converted to the first IF position and after conversion to the second sound intermediate frequencies, the sound carriers and the signals modulated thereon occur at the frequencies of 5.5 MHz and 5.742 MHz, respectively. To this end the picture carrier converted to the IF position of 38.9 MHz should be shifted downwards by 1 MHz in the example of FIG. 2 so that it occurs at a frequency of 37.9 MHz, because this frequency exactly supplies the desired frequency differences of 5.5 and 5.742 MHz for the sound carriers converted to the first IF position. This is shown by means of the curves PC' and C in FIGS. 2C and 2D.

Figure 2E:
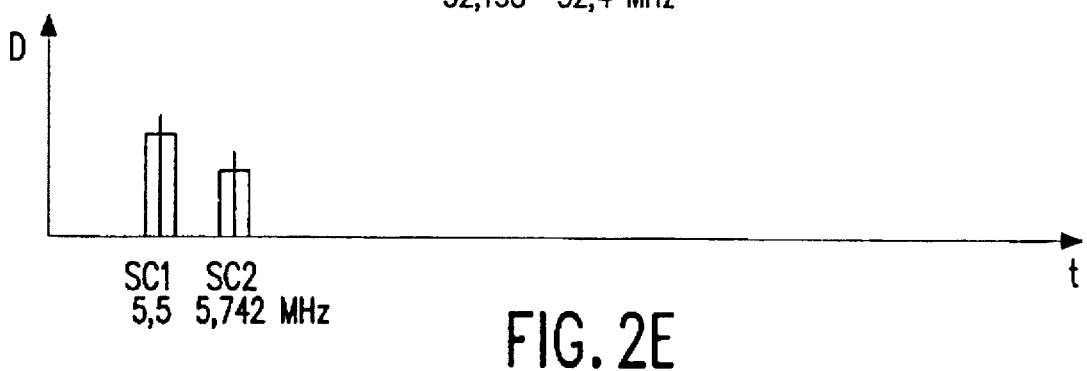

The curve D of FIG. 2E shows that at the chosen frequency shift by 1 MHz of the picture carrier converted to the IF position, the output signals of the mixer 7 indeed comprise the sound carriers SC1 and SC2 converted to the second IF position as well as the sound signals modulated thereon in the frequency range of 5.5 and 5.742 MHz. The sound carriers are thereby converted to the central frequencies of the filters 8 and 9 so that these signals can be directly filtered by means of these filters.

FIGS. 2A-2E shows that the shift of the picture carrier PC to the new value PC' should always be realized in such a way that the frequency spacing between PC' and the sound carriers converted to the first IF position yields the desired frequencies which should subsequently be filtered out.

Figure 3:
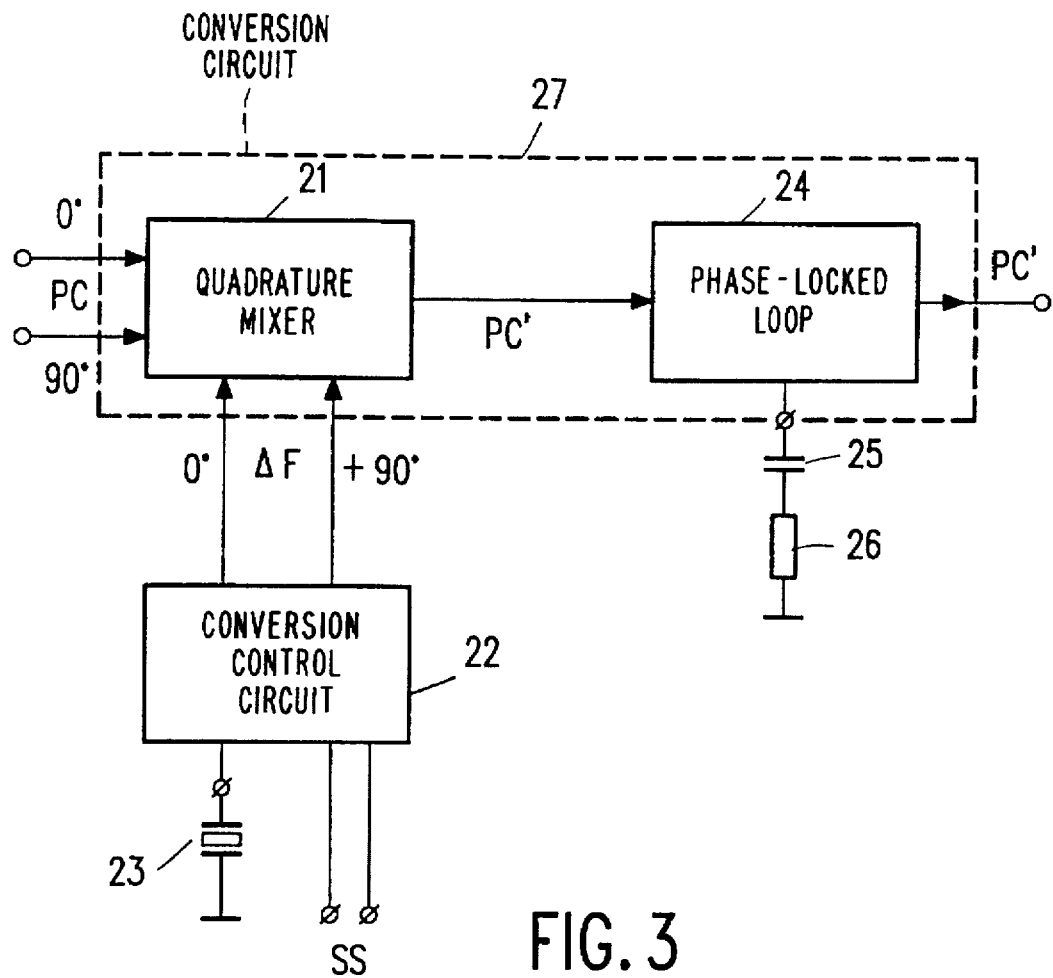
FIG. 3 shows an embodiment of the frequency-shift means in the circuit of FIG. 1.

A possible embodiment of the frequency shift means 6 for the circuit arrangement of FIG. 1 will now be elucidated with reference to the block diagram of FIG. 3.

The block diagram of FIG. 3 shows a conversion device 27 comprising a quadrature mixer 21 and a phase-locked loop circuit 24. FIG. 3 further shows a conversion control means 22.

The conversion control means 22, which receives a reference clock signal generated by an oscillator 23, generates a signal $\Delta F$ in dependence upon the transmission standard of the received television signal, which signal indicates the required frequency shift of the picture carrier. This signal is supplied in two phase positions, one of which is shifted +90° with respect to the other.

The information about the transmission standards of the received television signal is present anyway in multi-standard television receivers because it is also used for other purposes. This information is applied by means of a signal SS to the conversion control means 22 which generates the value $\Delta F$ in the required manner in dependence upon this signal.

Figure 4:
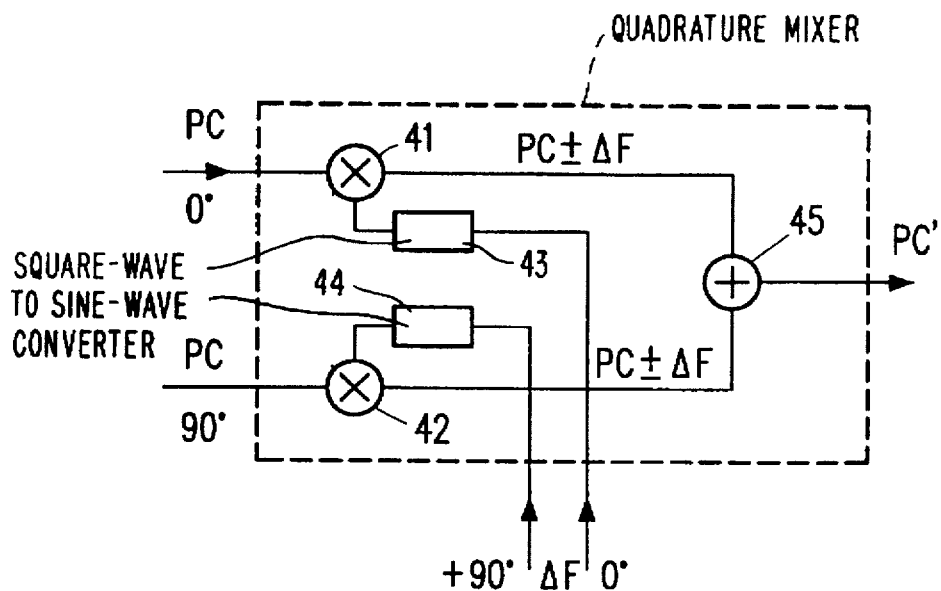
FIG. 4 shows a quadrature mixer for the arrangements of FIG. 1 and/or FIG. 3.

The mixer 21 of FIG. 3 may particularly be a quadrature mixer as shown in FIG. 4. The input of the mixer receives the picture carrier PC in phase positions 0° and +90°. The picture carrier with phase position 0° is applied to a mixer 41, the picture carrier with phase position +90° is applied to a second mixer 42. The conversion signals $\Delta F$ in the phase positions 0° and +90° supplied by the conversion control means 22 of FIG. 3 at the output are also applied to the mixers 41, 42, the signal in phase position 0° being applied to the mixer 41 and the signal in phase position +90° being applied to the mixer 42. If these conversion signals are square-wave signals, they may advantageously be applied to arrangements 43 and 44 for their conversion into sine-wave signals before they are applied to the mixers 41 and 42.

The mixer 41 of the quadrature mixer of FIG. 4 supplies the picture carrier applied thereto at the output, once for shifting the frequency of the conversion signal $\Delta F$ down, and once for shifting this frequency up. The mixer 42 also supplies the picture carrier which, as regards its frequency, is shifted downwards by the value of the conversion signal $\Delta F$. Moreover, it supplies this picture carrier frequency-shifted upwards by $\Delta F$, but this picture carrier is rotated by 180° as regards its phase position. If these output signals of the mixers 41 and 42 are superimposed in a summing device 45, the signal portions PC+$\Delta F$ of the mixer 41 and PC+$\Delta F$ of the mixer 42 cancel each other, which signal is, however, shifted 180° in phase with respect to the output signal of the mixer 41. The signal portions PC–$\Delta F$ of the output signals of the two mixers are, however, superimposed at the same phase so that they occur at the double amplitude in the output signal of the mixer 45. This signal is denoted by PC' in FIG. 4. Only small mixing products of the other frequencies are still present in this signal. To suppress these even further, FIG. 3 shows that a PLL 24 is subsequently arranged which locks in on this filtered, shifted picture carrier frequency PC' =PC–$\Delta F$. The conversion device 27 of FIG. 3 thereby supplies a stable picture carrier PC' at the output, which picture carrier is free from further mixed products. This signal may then advantageously be mixed with the sound signal of the multiplier of FIG. 1 converted to the first sound IF position. This multiplier 7 then supplies at its output the sound signals converted to the second sound IF position, which signals can be filtered out by means of the filters 8 and 9.

In this example, the signal portions PC+$\Delta F$ cancel each other during summing in the adder 45 and the signal portions PC–$\Delta F$ are superimposed at the same phase.

As a result, the mixing product of the lower frequency is filtered out. This may of course also be realized conversely.

for example, in such a way that the multiplier 42 receives the signal ΔF in a −90° phase position. Then, conversely, the signal portions PC−ΔF cancel each other and the signal portions PC+ΔF are superimposed at the same phase.

We claim:

1. A multi-standard television receiver for receiving television signals in accordance with a plurality of transmission standards, in which a picture signal, contained in a received television signal and modulated on a picture carrier is converted to a picture signal intermediate frequency, and a stereo sound signal or two-tone signal, contained in the television signal and modulated on two sound carriers, is converted to two first sound signal intermediate frequencies, wherein a frequency spacing between the picture carrier and said two sound carriers differs in dependence on the transmission standard of the received television signal, characterized in that said multi-standard television receiver comprises:

two sound signal filters having a fixed, predetermined filter central frequency for filtering the stereo sound signal; and frequency shift means for shifting, in dependence upon the frequency spacing between the picture carrier of the television signal and the two sound carriers, the picture carrier, contained in the picture signal converted to the IF position, to such a frequency that the sound IF signals of the two first sound intermediate frequencies mixed with this shifted picture carrier occur at two second sound signal intermediate frequencies which are filtered by the sound IF filters.

2. A multi-standard television receiver as claimed in claim 1, characterized in that the sound signal filters have central frequencies of 5.5 and 5.742 MHZ.

3. A multi-standard television receiver as claimed in claim 2, characterized in that the two first sound signal intermediate frequencies are 32.4 and 32.158 MHZ and the frequency to which the picture carrier, contained in the picture signal converted to the IF position, is shifted, is 37.9 MHZ.

4. A multi-standard television receiver as claimed in claim 1, characterized in that the frequency shift means comprises conversion control means for supplying conversion signals in dependence upon the transmission standard of the received television signal and the frequency spacing between the picture carrier and the two sound carriers prescribed in accordance with this transmission standard; and a conversion device, coupled to the conversion control means for receiving the conversion signals, for converting, in dependence upon the conversion signals, the frequency of the picture carrier contained in the picture signal converted to the IF position.

5. A multi-standard television receiver as claimed in claim 1, characterized in that the frequency shift means comprises a phase-locked loop circuit which locks in on the picture carrier which is shifted as regards its frequency.

6. A multi-standard television receiver as claimed in claim 1, characterized in that the frequency shift means comprises a quadrature mixer having a first multiplier in which the picture carrier converted to the IF position is mixed with a first difference signal, said difference signal having a frequency corresponding to the difference of the frequencies between the picture carrier converted to the IF position and the shifted picture carriers a second multiplier in which the picture carrier, converted to the IF position and shifted 90° in phase, is mixed with a second difference signal, said second difference signal being the same as the first difference signal shifted 90° in phase; and an adder for adding an output signal from the first multiplier to an output signal from the second multiplier.

7. A multi-standard television receiver as claimed in claim 6, characterized in that the conversion signals supplied by the conversion control means to the conversion device comprise the first difference signal and the second difference signal, and in that the phase-locked loop circuit precedes the adder which adds the signals supplied by the first and second multipliers.

* * * * *